(12) United States Patent
Jonsson et al.

(10) Patent No.: US 8,995,468 B2
(45) Date of Patent: *Mar. 31, 2015

(54) COMMUNICATION WITH COMPRESSED HEADERS

(71) Applicant: Telefonaktiebolaget L M Ericsson (Publ), Stockholm (SE)

(72) Inventors: Anders Jonsson, Taby (SE); Janne Peisa, Espoo (FI); Kai-Erik Sunell, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 31 days.

This patent is subject to a terminal disclaimer.

(21) Appl. No.: 13/873,630

(22) Filed: Apr. 30, 2013

(65) Prior Publication Data

US 2013/0215907 A1 Aug. 22, 2013

Related U.S. Application Data

(63) Continuation of application No. 12/866,172, filed as application No. PCT/IB2009/000197 on Aug. 4, 2010, now Pat. No. 8,509,263.

(60) Provisional application No. 61/025,971, filed on Feb. 4, 2008.

(51) Int. Cl.
*H04J 3/24* (2006.01)
*H04L 29/06* (2006.01)
*H04W 28/06* (2009.01)

(52) U.S. Cl.
CPC ............... *H04L 69/22* (2013.01); *H04L 69/04* (2013.01); *H04W 28/06* (2013.01)
USPC .......................................... 370/474; 370/477

(58) Field of Classification Search
CPC ..... H04W 69/04; H04W 69/22; H04W 28/06; H04W 28/065
USPC .................................. 370/397–399, 474–477
See application file for complete search history.

(56) References Cited

U.S. PATENT DOCUMENTS 6,032,197 A 2/2000 Birdwell et al.
8,509,263 B2 * 8/2013 Jonsson et al. ................ 370/474

(Continued)

OTHER PUBLICATIONS

ITU-R: "Framework for the Radio Interfaces and Radio Sub-System Functionality". ITU-R Recommendation M.1035. 1994.

(Continued)

*Primary Examiner* — Kan Yuen

(57) ABSTRACT

Communication efficiency may be enhanced by using compressed headers. In an example embodiment, a method is performed by a transmitting device to reduce header size. A mapping is created between a logical channel identifier and a compressed logical channel identifier. The compressed logical channel identifier occupies fewer bits than the logical channel identifier. The mapping is transmitted to a receiving device. A compressed header that includes the compressed logical channel identifier is formulated. A communication that includes the compressed header is transmitted to the receiving device. In another example embodiment, a method is performed by a receiving device to decode a header having a reduced size. A mapping and a communication including a compressed header are received. A compressed logical channel identifier is extracted from the compressed header. A logical channel identifier is recovered from the compressed logical channel identifier using the mapping.

20 Claims, 11 Drawing Sheets

(56) References Cited

U.S. PATENT DOCUMENTS

| | | |
|---|---|---|
| 2002/0001312 A1 | 1/2002 | Tomizawa |
| 2004/0147247 A1 | 7/2004 | Demetrescu et al. |
| 2005/0160184 A1 | 7/2005 | Walsh et al. |
| 2005/0213605 A1 | 9/2005 | Kim et al. |
| 2006/0078001 A1 | 4/2006 | Chandra et al. |
| 2006/0200673 A1 | 9/2006 | Zhang et al. |
| 2007/0127433 A1 | 6/2007 | Yeh |
| 2009/0003347 A1 | 1/2009 | Yang et al. |
| 2009/0196275 A1* | 8/2009 | Damnjanovic et al. ....... 370/345 |
| 2010/0027477 A1* | 2/2010 | Yi et al. ....................... 370/328 |
| 2010/0128742 A1 | 5/2010 | Chun et al. |

OTHER PUBLICATIONS

ITU-R: "Framework and overall objectives of the future development of IMT-2000 and systems beyond Imt-2000". ITU-R M.1645. Jun. 2003.

ITU-T: "Open Systems Interconnection—Model and Notation". ITU-T X.200. Jul. 1994.

ITU-R: "Detailed specifications of the radio interfaces of International Telecommunications-2000 (IMT-2000)". ITU-R M.1457.

LG Electronics Inc: "MAC-hs Format for VoIP Support". 3GPP TSG-RAN WG2 #56bis. R2-070257. Jan. 15-19, 2007. Sorrento, Italy.

* cited by examiner

COMMUNICATION WITH COMPRESSED HEADERS

CLAIM OF PRIORITY

This application is a continuation of U.S. patent application Ser. No. 12/866,172, filed Aug. 4, 2010, now U.S. Pat. No. 8,509,263, which is a 371 of PCT/IB09/00197, filed Feb. 3, 2009, which claims the benefit of U.S. Provisional Patent Application No. 61/025,971, filed Feb. 4, 2008. The contents of these documents are hereby incorporated by reference herein.

TECHNICAL FIELD

The present invention relates generally to communications systems, and in particular, but by way of example only, to communicating with compressed headers having shorter lengths than ordinary or standard headers.

BACKGROUND

Many specialized terms and abbreviations are used in the communications arts. At least some of the following are referred to within the text that follows, such as in this background and/or the description sections. Thus, the following terms and abbreviations are herewith defined:
3GPP 3rd Generation Partnership Project
ARQ Automatic Repeat-reQuest
C Compressed LCH-ID indicator
CDMA Code Division Multiple Access
DL Downlink
F Flag bit
HARQ Hybrid Automatic-Repeat-reQuest
HI Header Indicator
ID Identifier
IMT-2000 International Mobile Telecommunication-2000
IP Internet Protocol
ITU International Telecommunication Union
LCH Logical Channel
LI Length Indicator
LTE Long Term Evolution
MAC Medium Access Control
OSI Open Systems Interconnection
PDU Protocol Data Unit
RAN Radio Access Network
RRC Radio Resource Control
SDU Service Data Unit
SI Segmentation Indicator
SRB Signaling Radio Bearer
SW Stop and Wait
TSG Technical Specification Group
TSN Transmission Sequence Number
UE User Equipment
UMTS Universal Mobile Telecommunications System
UTRA UMTS Terrestrial Radio Access
UTRAN UMTS Terrestrial Radio Access Network
VoIP Voice over IP
Wi-Fi Wireless Fidelity
WiMAX Worldwide Interoperability for Microwave Access
WG Working Group Communication forms the backbone of today's information-oriented society. Communications may be transmitted over wireless or wired channels using, for example, radio frequency radiation, light waves, combinations thereof, and so forth. The usability and capacity of such communications is typically limited by the bandwidth of the communications channel. The bandwidth of a communications channel may be limited by the finite nature of the electromagnetic spectrum.

The available bandwidth of a communications channel, even given a finite allocation of the electromagnetic spectrum, may be increased by adopting any of a number of different schemes. This is because certain schemes enable more information to be communicated in a given spectrum allocation. Such efficient utilization of spectrum can reduce the cost of communication services being provided, can enable richer communication services to be provided, or both. Consequently, modern communications standards often attempt to efficiently utilize spectrum.

The evolution of communication standards, including telecommunication system standards, is currently focused on packet access technologies to increase the efficient utilization of spectrum. A principle of packet access technologies is that small data units or packets carry data over an underlying wireless or wired network (or communication medium) while some meta-data or packet header describes the data being communicated. The content of the packet header depends on the type of transferred data and the context of use.

An example of a telecommunications standard is the International Mobile Telecommunication-2000 (IMT-2000) family of standards, which are specified by the International Telecommunication Union (ITU) Radio communication sector (ITU-R). The IMT-2000 protocol architecture model defines service interfaces between different protocol layers as well as sub-layers thereof. Following commonly-accepted conventions, the packets that are exchanged between peer entities (e.g., those within the same layer) are called Protocol Data Units (PDU) whereas the packets that are exchanged between two entities from different layers are called Service Data Units (SDU).

One type of PDU corresponds to those PDUs that are carried on a Medium Access Control (MAC) layer; these are termed MAC PDUs. MAC PDUs often have predefined header formats. For example, a MAC header typically includes at least the following types of information: Logical Channel Identifier (LCH-ID), Transmission Sequence Number (TSN), and Length Indicator (LI). LCH-IDs indicate how different MAC services are addressed or referenced because multiple MAC services may be simultaneously extant. TSNs provide an appropriate PDU numbering because PDUs are sometimes lost or received out-of-order (e.g., due to HARQ retransmissions). The LI information indicates a length of the associated data.

FIG. 1 is an existing 24-bit header format 101 for MAC PDUs in accordance with IMT-2000. As illustrated, example header format 101 includes five fields. These five fields are: LCH-ID, LI, TSN, Segmentation Indicator (SI), and Flag (F). The LCH-ID field is four bits in length. The LI field is 11 bits. The TSN field is 6 bits, and the SI field is 2 bits. The F field is a one-bit flag. This existing header format 101 is therefore 24 bits long.

In certain environments, the two bits of the SI field indicate whether or not the associated data payload is segmented. If the data payload is segmented, the SI field may also indicate whether the associated data corresponds to a first segment, a middle segment, or a final segment. The F flag bit indicates whether the following information constitutes padding or a new header.

Usually, the relative amount of overhead consumed by each header as compared to the actual size of the associated payload is insignificant so long as the packets are large. This is normally the case for relatively high data rate services. The situation is different, however, for relatively low data rate services in which the packets are typically smaller. An example of a relatively low data rate service is Voice over IP (VoIP). In other words, header size can adversely impact communication efficiency, especially with relatively low data rate services.

This need has been addressed in the 3rd Generation Partnership Project (3GPP). Also, some proposals have been discussed within the Technical Specification Group (TSG) Radio Access Network (RAN) Working Groups (WG), which are responsible for Universal Mobile Telecommunications System (UMTS) Terrestrial Radio Access (UTRA) and Evolved UTRA standardization.

For example, one proposed approach is to utilize the UTRAN retransmission protocol structure. The UTRAN retransmission protocol structure is composed of multiple parallel Stop-and-Wait (SW) Automatic Repeat-reQuest (ARQ) processes. In short, this approach involves reserving one ARQ process for low data-rate services, such as VoIP. Consequently, there is no need to use a header in the MAC PDU because the receiver can infer the LCH-ID from the ARQ process ID. Also, because SW ARQ protocols do not reorder packets, there is accordingly no need for TSNs.

Unfortunately, this proposed approach entails a number of deficiencies. Specifically, reserving one ARQ process for one specific service, e.g. VoIP, has the following downsides. Firstly, the peak data rate is limited because only one process is available. Secondly, the arrival process for incoming data units is typically characterized by a level of uncertainty inasmuch as data units sometimes arrive in clusters with long gaps between the clusters. The reserved ARQ process is therefore occasionally idle—i.e., the reserved ARQ resource is sometimes unused, which has a negative impact on other services and resource efficiency as well as on peak data rates.

Consequently, there is a continuing need to address the problems and deficiencies in the current state of the art that relate to the overhead inefficiencies of low data rate services. Such deficiencies and other needs are addressed by one or more of the various described embodiments of the present invention.

SUMMARY

It is an object of certain embodiment(s) of the present invention to at least mitigate or ameliorate some of the deficiencies existing in the current state of the art. It is another object of certain embodiment(s) of the present invention to reduce the overhead of low data rate services. It is yet another object of certain embodiment(s) of the present invention to use spectrum more efficiently and improve coverage for low data rate services without an appreciable impact on other services.

Communication efficiency may be enhanced by using compressed headers. In an example embodiment, a method is performed by a transmitting device to reduce header size. A mapping is created between a logical channel identifier and a compressed logical channel identifier. The compressed logical channel identifier occupies fewer bits than the logical channel identifier. The mapping is transmitted to a receiving device. A compressed header that includes the compressed logical channel identifier is formulated. A communication that includes the compressed header is transmitted to the receiving device.

In another example embodiment, a method is performed by a receiving device to decode a header having a reduced size. A mapping is received. A communication including a compressed header is received from a transmitting device. A compressed logical channel identifier is extracted from the compressed header. A logical channel identifier is recovered from the compressed logical channel identifier using the mapping. The logical channel identifier occupies more bits than the compressed logical channel identifier.

In certain example implementations, compressed header presence information that indicates whether a header is a compressed header is communicated between a transmitting device and a receiving device. The compressed header presence information may be provided using an out-of-band mechanism or an in-band mechanism. In either case, the compressed header presence information may be communicated through signaling that is separate from the header itself. Alternatively, an example in-band mechanism entails including a header indicator field in a compressed header as the compressed header presence information. Example transmitting device and receiving device embodiments are also described.

An advantage of certain embodiment(s) of the present invention is that the overhead for low data rate services may be reduced to thereby use spectrum more efficiently. Another advantage of certain embodiment(s) of the present invention is that the overhead for low data rate services may be reduced to thereby improve system coverage.

Additional embodiments are described and/or claimed herein. Example additional embodiments include, by way of example but not limitation, methods, devices, arrangements, memory, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

As explained herein above, data payloads are usually associated with and transmitted along with respective headers. The length of a conventional header is only marginally important when it is associated with a relatively high data rate service that produces large data payloads. If the payload is for a relatively low data rate service, on the other hand, the overhead bandwidth consumed by a conventional header can negatively impact communication efficiency. Existing approaches are deficient inasmuch as they fail to remedy this communication inefficiency without introducing substantial drawbacks.

In contradistinction, example embodiments as described herein relate to communication systems that at least ameliorate this communication inefficiency while introducing no more than an acceptable level of complication or other overhead. By way of example, a flexible header format may be adopted in which a current header format is selected from two or more possible header formats. The header formats may include both ordinary and compressed header formats. In an example implementation, one or more of the compressed header formats may be a special case of the ordinary header format. Moreover, the ordinary header format may fully or substantially comport with a conventional header format as stipulated by a given communications standard.

Figure 2:
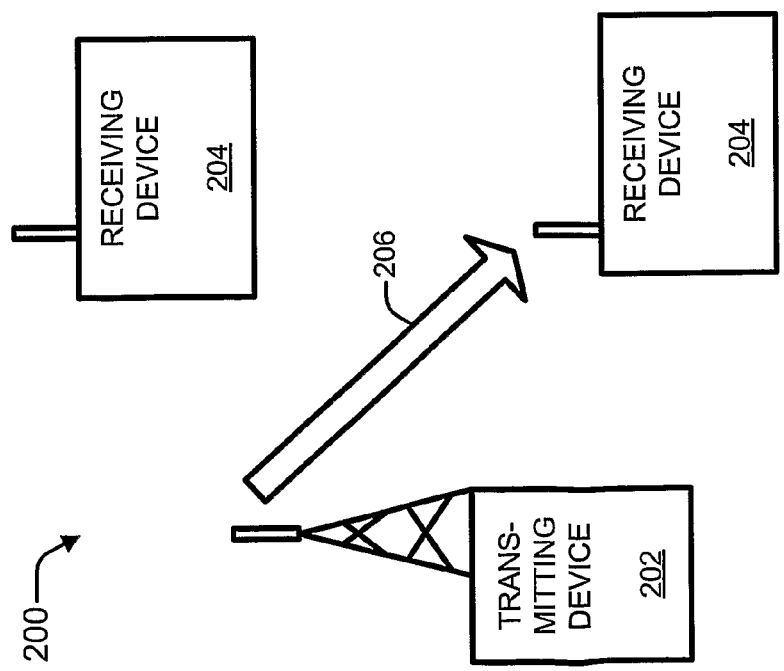
FIG. 2 is a block diagram of an example communication environment that includes a transmitting device and multiple receiving devices.

FIG. 2 is a block diagram of an example communication environment 200 that includes a transmitting device 202 and multiple receiving devices 204. As illustrated, communication environment 200 includes a signal 206 that is being propagated over a channel (not separately indicated) from transmitting device 202 to receiving device 204. Although not explicitly shown, transmitting device 202 includes at least one transmitter, and receiving device 204 includes at least one receiver. When bidirectional communications are supported, transmitting device 202 may also include at least one receiver, and receiving device 204 may also include at least one transmitter. A joint transmitter and receiver may be realized as a transceiver.

In an example operation, transmitting device 202 may transmit signal 206 over a channel to receiving device 204. Receiving device 204 receives signal 206 from transmitting device 202 via the channel. Signal 206 may include an ordinary header or a compressed header, as is described herein, as well as a data payload. More specifically, signal 206 may include one or more of the example header formats that are illustrated in FIGS. 3-7. A signal 206 may also include compressed header presence information that indicates whether a header is compressed. Compressed header presence information, which may be separate from or part of a header, is described further herein below with particular reference to FIG. 10. It should be understood that a single device or other arrangement may function as a transmitting device 202 at one moment and/or with respect to one communication and as a receiving device 204 at another moment and/or with respect to another communication.

Although transmitting device 202 is shown as being relatively fixed, and receiving device 204 is shown as being relatively mobile, each may be realized differently. For example, both may be fixed, or both may be mobile. Also, transmitting device 202 may be mobile while receiving device 204 is fixed. Additionally, although communication environment 200 is illustrated as being a wireless communication environment utilizing a wireless medium, it may alternatively be realized as a wired communication environment utilizing a wired medium. Hence, the channel over which signal 206 is propagated may be a wired channel or a wireless channel. Signal 206 may be propagated as a radio frequency signal, a light signal, another electromagnetic signal, some combination thereof, and so forth.

Transmitting devices 202 and receiving devices 204 may comprise, by way of example but not limitation and especially in the context of a wireless communications environment, network communication nodes, remote terminals, and other devices that are capable of communicating a signal 206 over a wireless channel. Network communication nodes may include, for example, a base transceiver station, a radio base station, a Node B, an access point, and so forth. Remote terminals may include, for example, a mobile terminal, a mobile station, a subscriber station, user equipment (UE), a communication card or module, and so forth. Transmitting devices 202 and receiving devices 204 may also be any wired or wireless device that is capable of processing instructions and participating in a communication.

Thus, a transmitting device 202 and/or a receiving device 204 may include at least one processor and one or more memories (not shown). The processor may be realized as a general-purpose or a special-purpose processor. Examples include, but are not limited to, a central processing unit (CPU), a digital signal processor (DSP), a microprocessor, some combination thereof, and so forth. Generally, such a processor is capable of executing, performing, and/or otherwise effectuating processor-executable instructions. The one or more memories store or include such processor-executable instructions that are executable by the processor to effectuate the performance of functions by the device 202 or 204.

Processor-executable instructions may be embodied as software, firmware, hardware, fixed or hard-coded logic circuitry, combinations thereof, and so forth. A processor and the processor-executable instructions of a memory may be realized separately (e.g., as a DSP executing code) or in an integrated form (e.g., as part of an application-specific integrated circuit (ASIC)). Thus, example operational implementations of processor-executable instructions include, but are not limited to, a memory coupled to a processor, an ASIC, a DSP and associated code, some combination thereof, and so forth.

Figure 1:
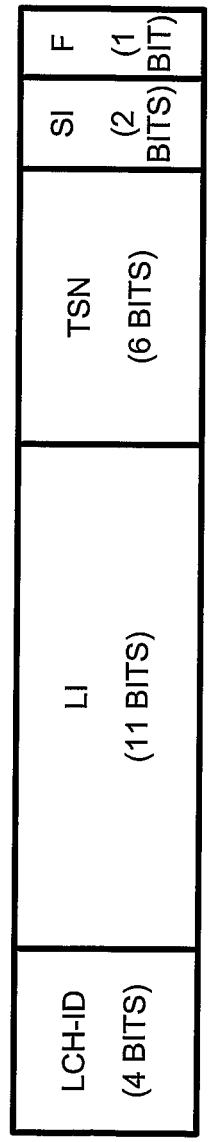
FIG. 1 is an existing 24-bit header format for MAC PDUs in accordance with IMT-2000.
Figure 3:
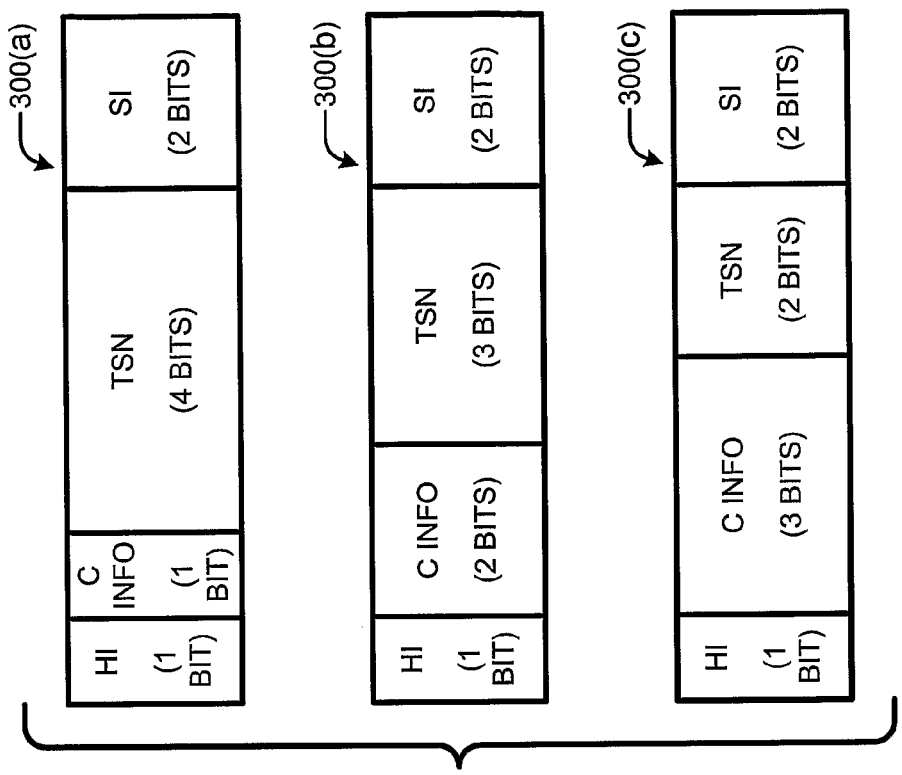
FIG. 3 depicts example compressed header formats having an 8-bit length and a header indicator (HI) field.

FIG. 3 depicts example compressed header formats 300 having an 8-bit length and a header indicator (HI) field. As illustrated, each compressed header format 300 includes an HI field, a Compressed Channel (C) Info field, a TSN field, and an SI field. The purpose and meaning of the TSN field and the SI field are described herein above. In certain embodiments, an SI field having two bits is maintained while the TSN field is reduced to two, three, or four bits. The fewer bits assigned to the TSN field is enabled by the relatively low data rate traffic that is expected for, e.g., VoIP and Signaling Radio Bearer (SRB) types of traffic.

For certain example embodiments, the HI field indicates whether or not the header is a compressed header or an ordinary header. For example, an HI value of "1" may represent a compressed header, and an HI value of "0" may represent an ordinary, uncompressed header (or vice versa). In an example implementation, the HI field comprises one bit.

In example embodiments, the C Info field includes one or more bits conveying compressed channel (C) information. The C bit(s) serve to represent the logical channel indicator in a compressed form. More specifically, the C information (e.g., the one, two, or three bits in compressed header formats 300) determines the mapping of the associated data payloads to higher layers and services. This can be facilitated, for example, by Radio Resource Control (RRC) signaling to the receiving device (e.g., to user equipment) where the LCH-ID mapping is determined from the C Info field if the HI field indicates that the header is a compressed header.

The compression of bits representing the logical channel or service can reduce the assigned four bits, which originally indicate the LCH-ID mapping, to three or fewer bits while retaining some flexibility to map services. For instance, the C bit or bits can be used to indicate to a receiving device what data is Signaling Radio Bearer (SRB) data, what data is voice codec, and so forth. Example schemes for mapping a compressed LCH-ID to a (non-compressed) LCH-ID are described further herein below with particular reference to FIG. 8.

In an example implementation, a compressed header format 300(a) includes the following fields: an HI field with one bit, a C Info field with one bit, a TSN field with four bits, and an SI field with two bits (1/1/4/2). In another example implementation, a compressed header format 300(b) includes the following fields: an HI field with one bit, a C Info field with two bits, a TSN field with three bits, and an SI field with two bits (1/2/3/2). In yet another example implementation, a compressed header format 300(c) includes the following fields: an HI field with one bit, a C Info field with three bits, a TSN field with two bits, and an SI field with two bits (1/3/2/2).

Compressed header format 300(a) can enable the reordering of up to $2^4$=16 packets and the mapping of two services with a TSN field of four bits and a C Info field of one bit, respectively. In contrast, compressed header format 300(b) can enable the reordering of up to $2^3$=8 packets and the mapping of four services with a TSN field of three bits and a C Info field of two bits, respectively. Thus, the former prioritizes packet reordering capabilities over number of services, and the latter prioritizes number of services over packet reordering capabilities. For compressed header format 300(c), up to $2^2$=4 packets can be reordered, and up to eight services may be mapped with a TSN field of two bits and a C Info field of three bits, respectively. Reserving just two bits for the TSN field may be sufficient, for example, for services such as VoIP in which packets are sent relatively infrequently.

Compressed header format 300(a) has one C bit. Compressed header format 300(b) has two C bits. Compressed header format 300(c) has three C bits. These formats therefore allow the mapping of up to two, four, and eight flows, respectively. These two, four, or eight flows may be mapped, however, to any of the sixteen flows enabled by the four bits of a traditional LCH-ID. Example mapping schemes are described further herein below with particular reference to FIG. 8.

These 8-bit compressed header formats do not, however, facilitate multiple SDUs per MAC-i/is transmission because the LI field is omitted, but multiple SDUs can be sent by means of an ordinary header. In other words, one SDU may be transmitted per 8-bit compressed header. In certain implementations, a receiving MAC entity should therefore not expect to receive any LI information or a flag bit F if an SI indicates that the PDU contains a complete SDU. On the other hand, a fraction of an SDU may be communicated because even these 8-bit compressed header formats retain the SI field. This ability enables coverage (e.g., for VoIP services, etc.) to be extended by dividing the transmission of an SDU into multiple PDUs.

Compressed header formats 300 consume eight bits. This is a relatively dramatic reduction from the 24 bits of a standard header. However, some functionality is lost by omitting other fields (e.g., the LI field and the F field) from the 24-bit standard header. A middle approach is described below using compressed header formats that consume 16 bits. It should be noted that multiple SDUs per MAC-i/is transmission can be enabled with the 16-bit compressed headers described below that do include an LI field.

Figure 4:
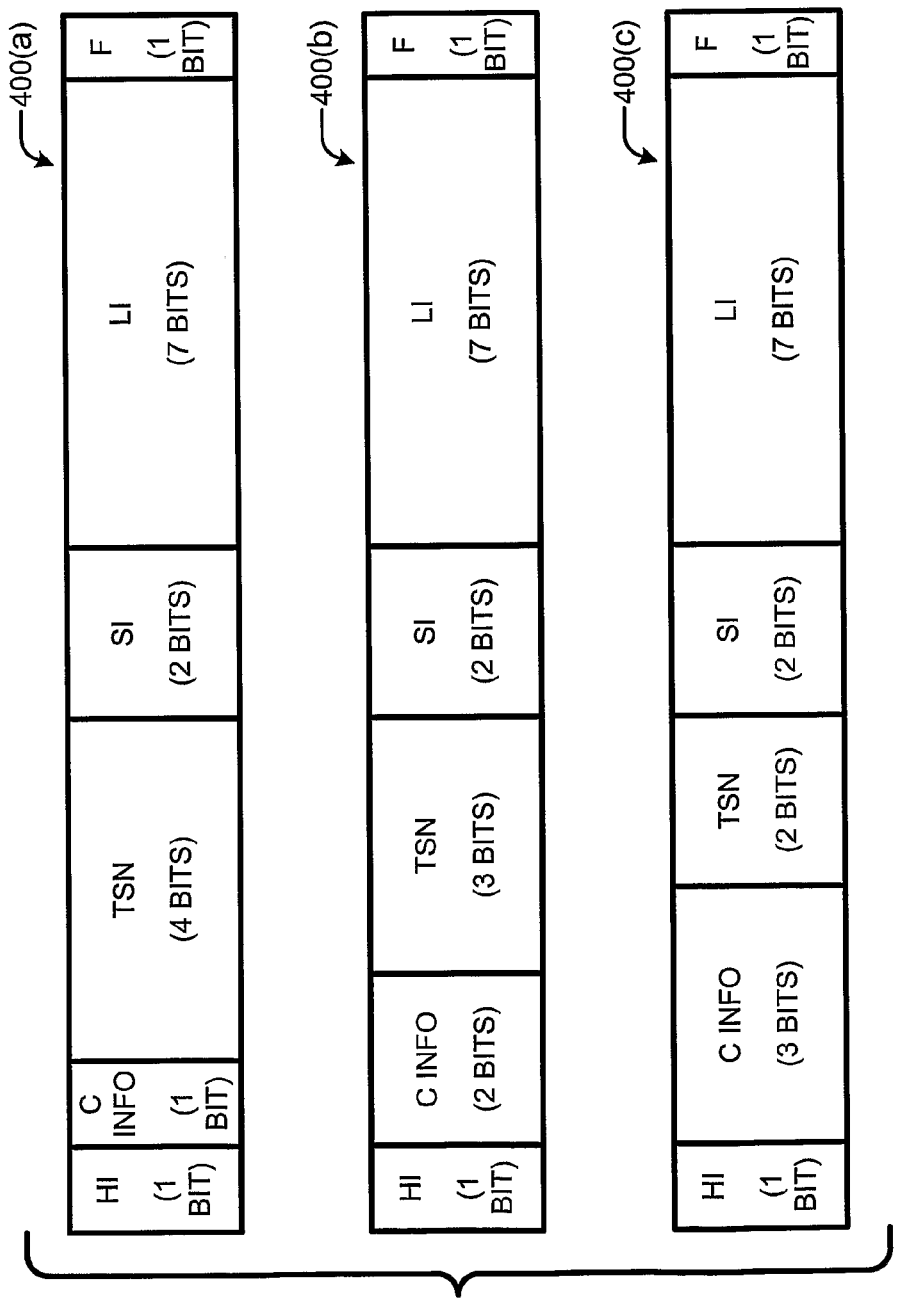
FIG. 4 depicts example compressed header formats having a 16-bit length and an HI field.

FIG. 4 depicts example compressed header formats 400 having a 16-bit length and an HI field. As illustrated, each compressed header format 400 includes an HI field, a C Info field, a TSN field, an SI field, an LI field, and an F field. The additional 8 bits (as compared to compressed header formats 300) are assigned to the LI field and the F field. The purpose and meaning of the LI field and the F field are described herein above.

In example embodiments, the LI field consumes seven bits. With seven bits, compressed header formats 400 are capable of indicating payload sizes up to $2^7$=128 units. The 16-bit compressed header formats 400 enable utilization of the additional functionality of the LI field and the F field without committing to the full 24 bits of a standard header format.

In an example implementation, a compressed header format 400(a) includes the following fields: an HI field with one bit, a C Info field with one bit, a TSN field with four bits, an SI field with two bits, an LI field with seven bits, and an F field with one bit (1/1/4/2/7/1). In another example implementation, a compressed header format 400(b) includes the following fields: an HI field with one bit, a C Info field with two bits, a TSN field with three bits, an SI field with two bits, an LI field with seven bits, and an F field with one bit (1/2/3/2/7/1). In yet another example implementation, a compressed header format 400(c) includes the following fields: an HI field with one bit, a C Info field with three bits, a TSN field with two bits, an SI field with two bits, an LI field with seven bits, and an F field with one bit (1/3/2/2/7/1).

Figure 5:
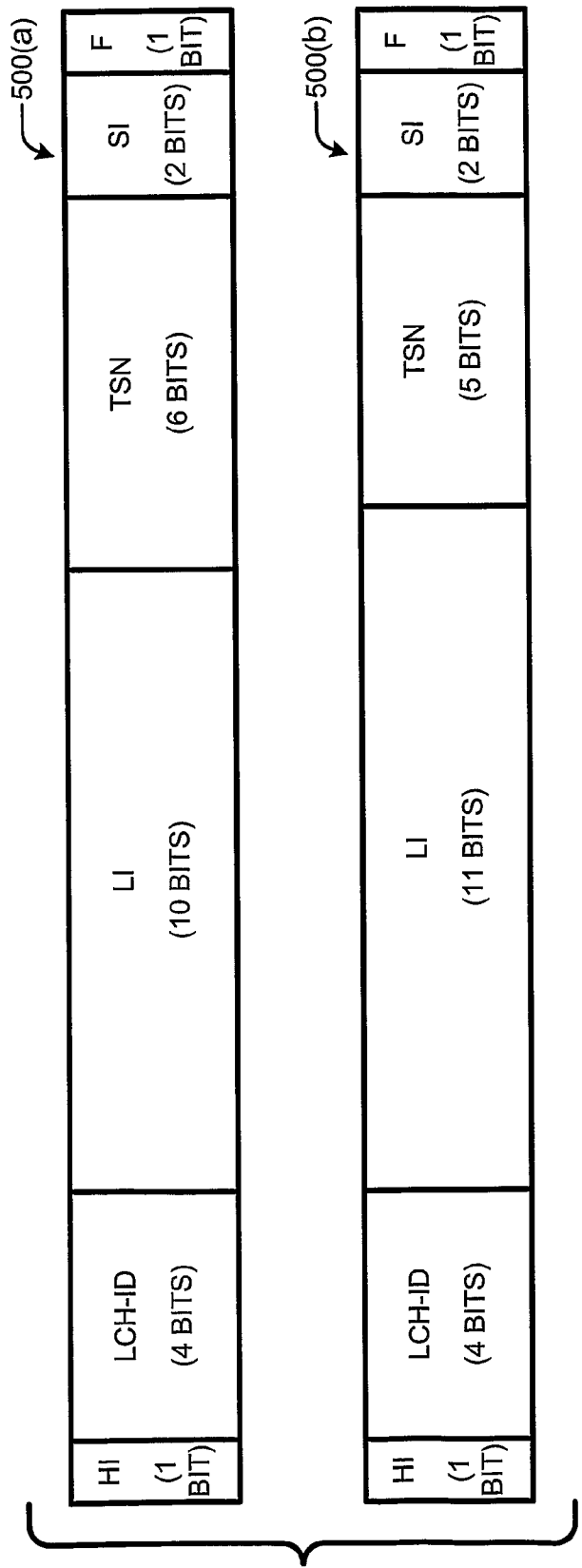
FIG. 5 depicts example uncompressed header formats having a 24-bit length and an HI field.

FIG. 5 depicts example uncompressed header formats 500 having a 24-bit length and an HI field. As illustrated, each uncompressed ordinary header format 500 includes an HI field, an LCH-ID field, an LI field, a TSN field, an SI field, and an F field. In the header embodiments of FIGS. 3-5, an HI field is used to indicate whether or not a compressed header is present. Hence, an ordinary uncompressed header also includes an HI field so that the header may indicate that it is an uncompressed header.

In an example implementation, a compressed header format 500(a) includes the following fields: an HI field with one bit, an LCH-ID field with four bits, an LI field with 10 bits, a TSN field with six bits, an SI field with two bits, and an F field with one bit (1/4/10/6/2/1). In another example implementation, a compressed header format 500(b) includes the following fields: an HI field with one bit, an LCH-ID field with four bits, an LI field with 11 bits, a TSN field with five bits, an SI field with two bits, and an F field with one bit (1/4/11/5/2/1).

Compressed header format 500(a) can therefore indicate payload sizes up to $2^{10}$=1024 units and enable the reordering of up to $2^6$=64 packets. In contrast, compressed header format 500(b) can indicate payload sizes up to $2^{11}$=2048 units and enable the reordering of up to $2^5$=32 packets. Thus, the former prioritizes packet (re-)ordering over the indication of payload size, and the latter prioritizes the indication of payload size over packet (re-)ordering.

Some communication standards stipulate that a maximum PDU size is 1504 octets. In such situations, an LI field of 11 bits enables this maximum size to be accommodated, so header format 500(b) can be adopted. Moreover, a common HARQ window size is 16. A five-bit TSN field can handle re-orderings up to 32 packets, so header format 500(b) is sufficient in this regard as well.

In the header embodiments of FIGS. 3-5, an HI field is used to indicate whether or not a compressed header is present. Consequently, the HI field (e.g., of one bit) consumes bandwidth on each transmitted header. Alternatively, the use of a compressed header and/or the cessation of compressed headers may be indicated through signaling. Example signaling mechanisms for indicating the presence of compressed headers are described herein below with particular reference to FIG. 10. Compressed header embodiments in which signaling mechanisms are used to indicate the presence of compressed headers are described below with particular reference to FIGS. 6 and 7.

Figure 6:
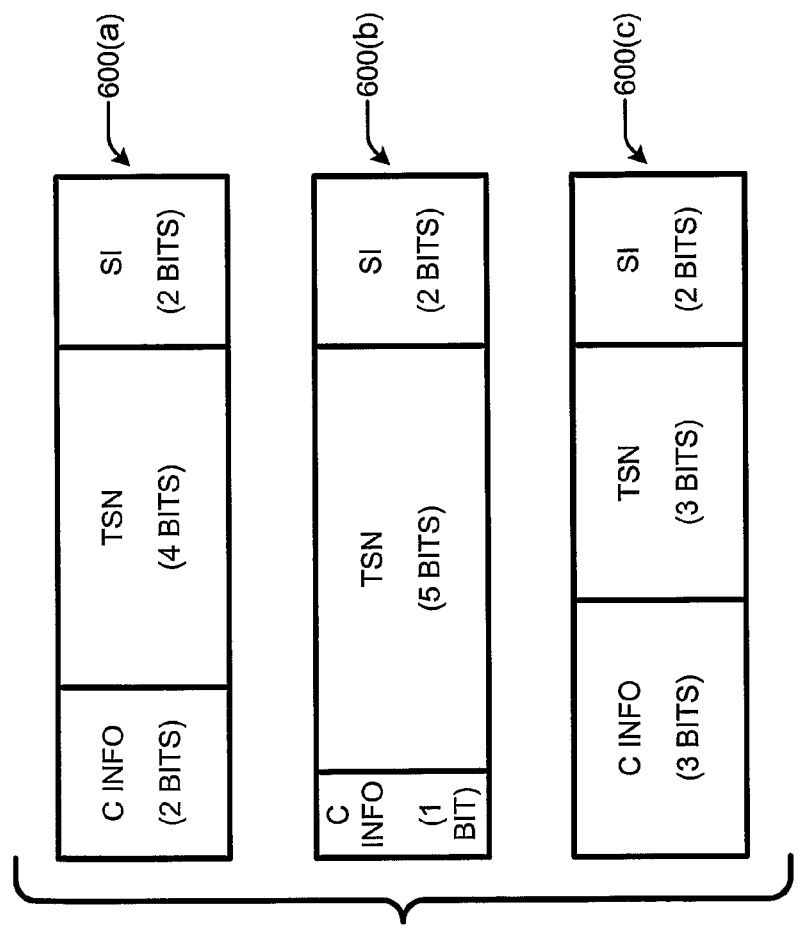
FIG. 6 depicts example compressed header formats having a length of 8-bits without an HI field.

FIG. 6 depicts example compressed header formats 600 having a length of 8-bits and no HI field. As illustrated for example embodiments, each compressed header format 600 includes a C Info field, a TSN field, and an SI field. As compared to the 8-bit compressed header formats of FIG. 3, an extra bit may be assigned to the C Info field or to the TSN field. The relative lengths of the C Info and the TSN fields may be selected in dependence on the relative importance placed on the number of services that can be mapped versus the number of packets that can be reordered, respectively.

In a first example implementation, a compressed header format 600(a) includes the following fields: a C Info field with two bits, a TSN field with four bits, and an SI field with two bits (2/4/2). In a second example implementation, a compressed header format 600(b) includes the following fields: a C Info field with one bit, a TSN field with five bits, and an SI field with two bits (1/5/2). In a third example implementation, a compressed header format 600(c) includes the following fields: a C Info field with three bits, a TSN field with three bits, and an SI field with two bits (3/3/2).

Figure 7:
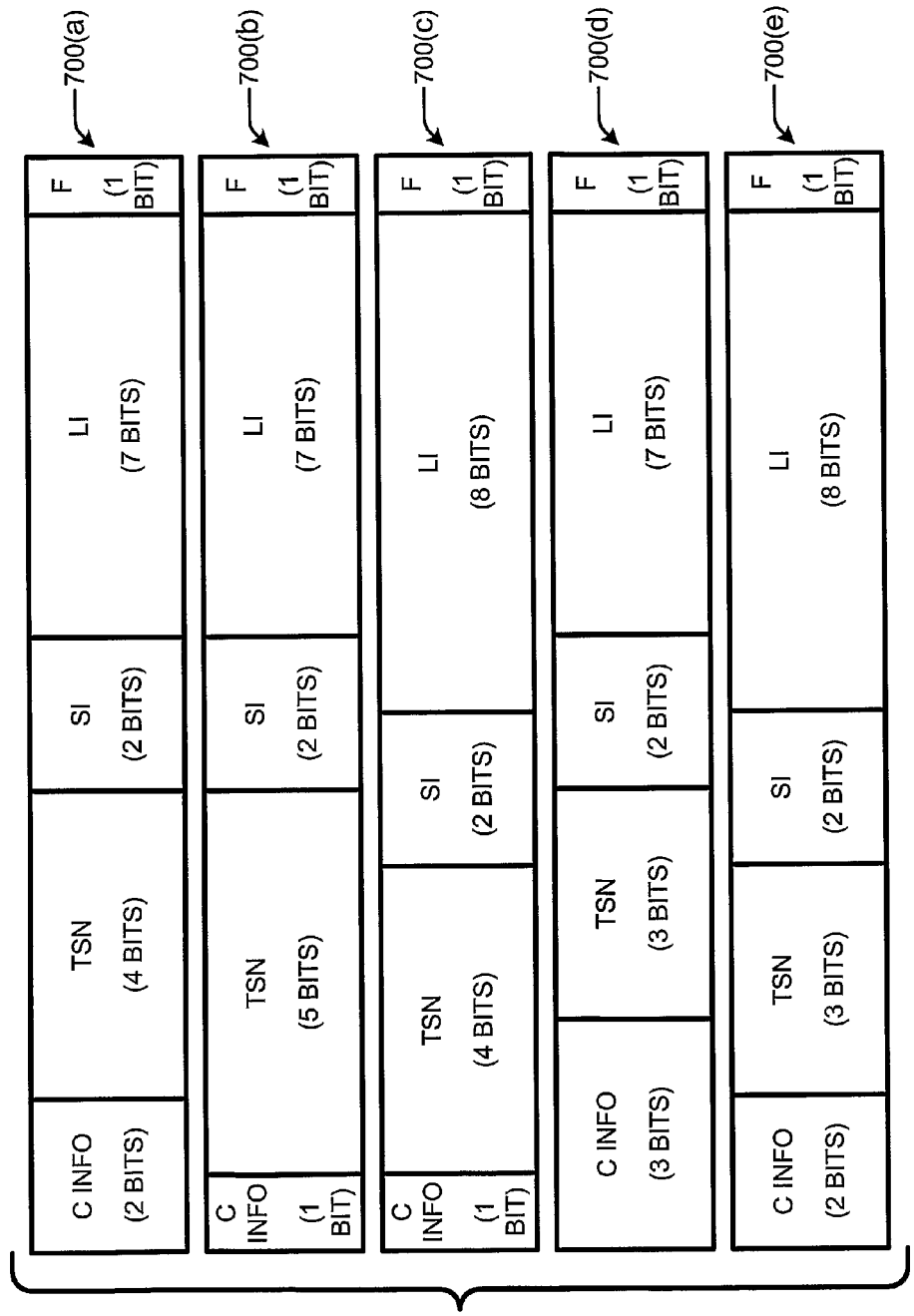
FIG. 7 depicts example compressed header formats having a length of 16-bits without an HI field.

FIG. 7 depicts example compressed header formats 700 having a length of 16-bits and no HI field. As illustrated for example embodiments, each compressed header format 700 includes a C Info field, a TSN field, an SI field, an LI field, and an F field. As compared to the 16-bit compressed header formats of FIG. 4, an extra bit may be assigned to the C Info field, the TSN field, or the LI field. The relative lengths of the C Info field, the TSN field, and the LI field may be selected in dependence on the relative importance placed (i) on the number of services that can be mapped, (ii) on the number of packets that can be reordered, and (iii) on the length of the following data that can be indicated, respectively.

In a first example implementation, a compressed header format 700(a) includes the following fields: a C Info field with two bits, a TSN field with four bits, an SI field with two bits, an LI field with seven bits, and an F field with one bit (2/4/2/7/1). In a second example implementation, a compressed header format 700(b) includes the following fields: a C Info field with one bit, a TSN field with five bits, an SI field with two bits, an LI field with seven bits, and an F field with one bit (1/5/2/7/1).

In a third example implementation, a compressed header format 700(c) includes the following fields: a C Info field with one bit, a TSN field with four bits, an SI field with two bits, an LI field with eight bits, and an F field with one bit (1/4/2/8/1). In a fourth example implementation, a compressed header format 700(d) includes the following fields: a C Info field with three bits, a TSN field with three bits, an SI field with two bits, an LI field with seven bits, and an F field with one bit (3/3/2/7/1). In a fifth example implementation, a compressed header format 700(e) includes the following fields: a C Info field with two bits, a TSN field with three bits, an SI field with two bits, an LI field with eight bits, and an F field with one bit (2/3/2/8/1).

It should be understood that other header formats with different tradeoffs and prioritizations may alternatively be implemented. For example, with reference to compressed header format 300(a) (of FIG. 3), the SI field may be omitted so that the TSN field may be expanded (e.g., by two bits to six total bits). This would allow alignment of SDUs to be retained. Such a substitution or other modifications may be employed in other ones of the example header formats. It should be noted that much of the description herein focuses on communications at the MAC layer with header formats that comport with the radio interfaces of an IMT-2000 communications environment. However, this is by way of example only, for embodiments may be implemented in different layers and/or realized with different communication environments. Other applicable, e.g., wireless system environments include, but are not limited to, Bluetooth®, LTE, CDMA2000®, WCDMA, Wi-Fi®, WIMAX®, satellite systems, combinations thereof, and so forth.

Figure 8:
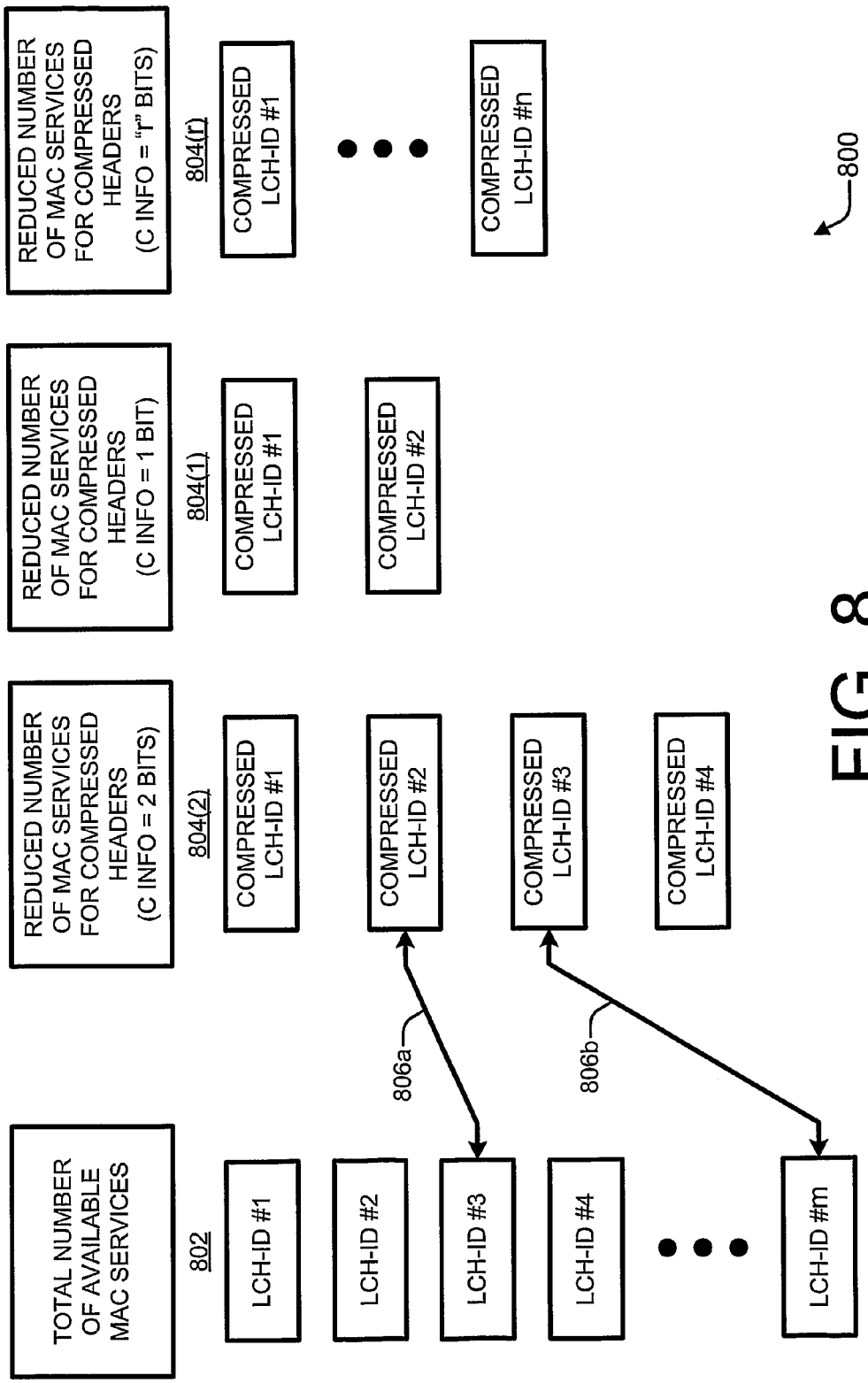
FIG. 8 illustrates an example mapping scheme between a logical channel identifier and a compressed logical channel identifier.

FIG. 8 illustrates an example mapping scheme 800 between a logical channel identifier 802 and a compressed logical channel identifier 804. In a given environment, a total number of available Medium Access Control (MAC) services are assigned to "m" LCH-IDs 802, with "m" representing some positive integer. As illustrated, these MAC services include LCH-ID #1, LCH-ID #2, LCH-ID #3, LCH-ID #4 . . . LCH-ID #m. A mapping 806 is established between a LCH-ID 802 from the total number of available MAC services and a compressed LCH-ID 804 from a reduced number of MAC services for compressed headers.

In example embodiments, a reduced number of MAC services are offered for compressed headers and assigned to a predetermined number of compressed LCH-IDs 804. A maximum allowable value for the predetermined number is based on the number of C bits in the C Info field. When the C Info field includes two bits, the compressed LCH-ID 804(2) includes up to four compressed logical channel identifiers: LCH-ID #1, LCH-ID #2, LCH-ID #3, and LCH-ID #4. When the C Info field includes one bit, the compressed LCH-ID 804(1) includes up to two compressed logical channel identifiers: LCH-ID #1 and LCH-ID #2. Generally, when the C Info field includes "r" bits, the compressed LCH-ID 804(r) includes up to "n" compressed logical channel identifiers: LCH-ID #1 . . . LCH-ID #n (with $2^r$=n).

A more specific example is described in the context of a C Info field comprised of two bits such that four different compressed LCH-IDs 804(2) are available. In this example, a mapping 806a is established between LCH-ID #3 and compressed LCH-ID #2. Another mapping is established between LCH-ID #m and compressed LCH-ID #3. Mapping 806 may be bidirectional. Thus, in an example operation, a transmitting device encodes a given MAC service of LCH-ID #3 as compressed LCH-ID #2 using mapping 806a. Upon receipt of a compressed header, a receiving device uses mapping 806a to decode the compressed LCH-ID #2 as LCH-ID #3, which corresponds to the given MAC service.

The mapping information for mapping 806 is typically determined by the transmitting device. The receiving device, however, uses the mapping 806 in order to decompress the compressed LCH-ID to recover the original LCH-ID. Consequently, in such cases the information that enables mapping 806 to be performed is communicated from the transmitting device to the receiving device.

Figure 9:
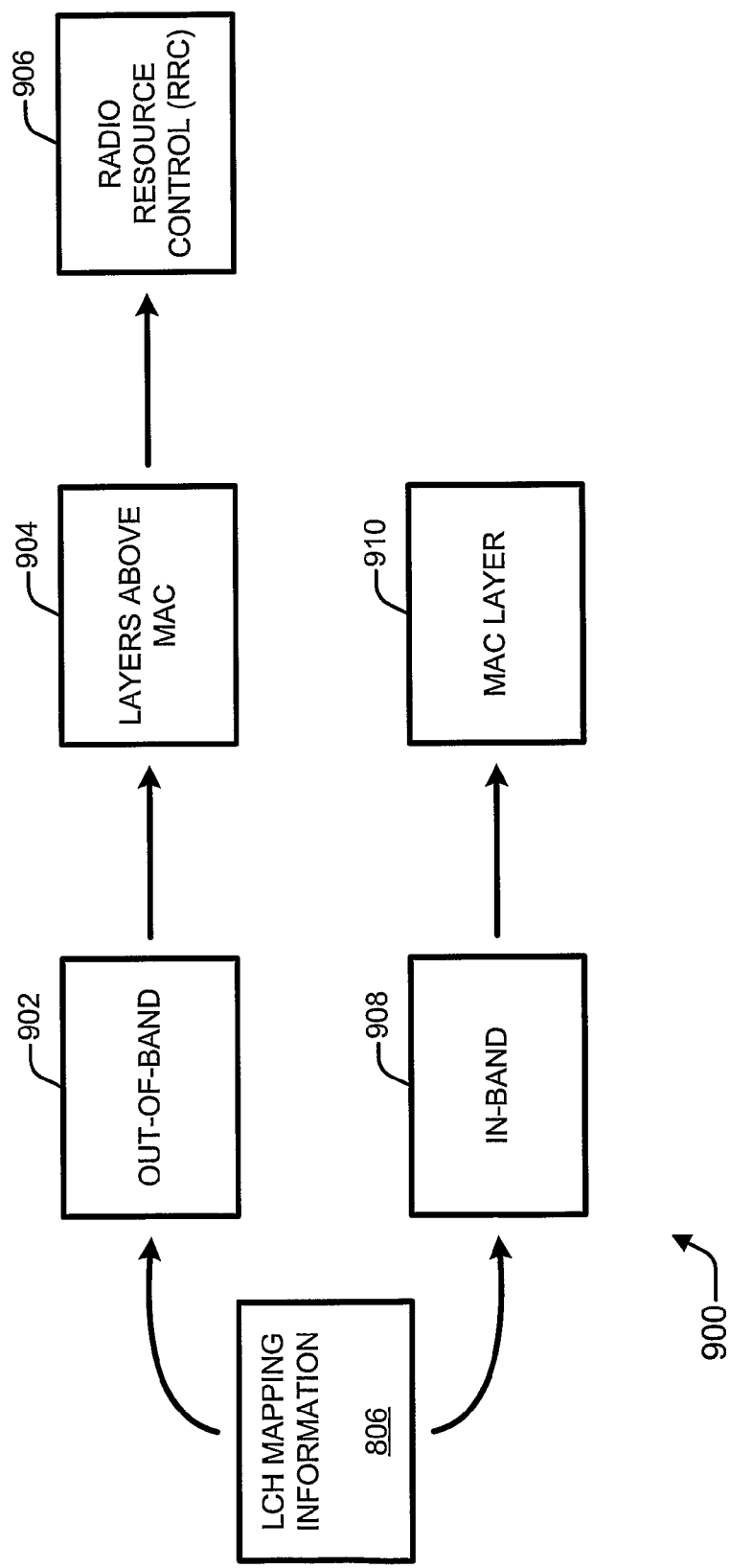
FIG. 9 illustrates example communication mechanisms for communicating logical channel mapping information.

FIG. 9 illustrates example communication mechanisms 900 for communicating logical channel mapping information 806. As illustrated, communication mechanisms 900 include out-of-band mechanisms 902 and in-band mechanisms 908. LCH mapping information 806 may be provided from a transmitting device or from another device that establishes the mapping between a LCH-ID and a compressed LCH-ID. For example embodiments, LCH mapping information 806 may be provided to a receiving device using an out-of-band mechanism 902 or an in-band mechanism 908.

By way of example only, out-of-band mechanisms 902 include one or more layers above a MAC layer 904. The layers above the MAC layer include, for instance, a radio resource control (RRC) layer 906. Also by way of example, in-band mechanisms 908 include communications over the MAC layer 910 (for an embodiment in which compressed headers are being communicated over a MAC layer). Other mechanisms for communicating LCH mapping information 806 may alternatively be employed. Furthermore, the mapping may be fixed or otherwise predefined such that communication thereof to the receiving device is obviated.

Figure 10:
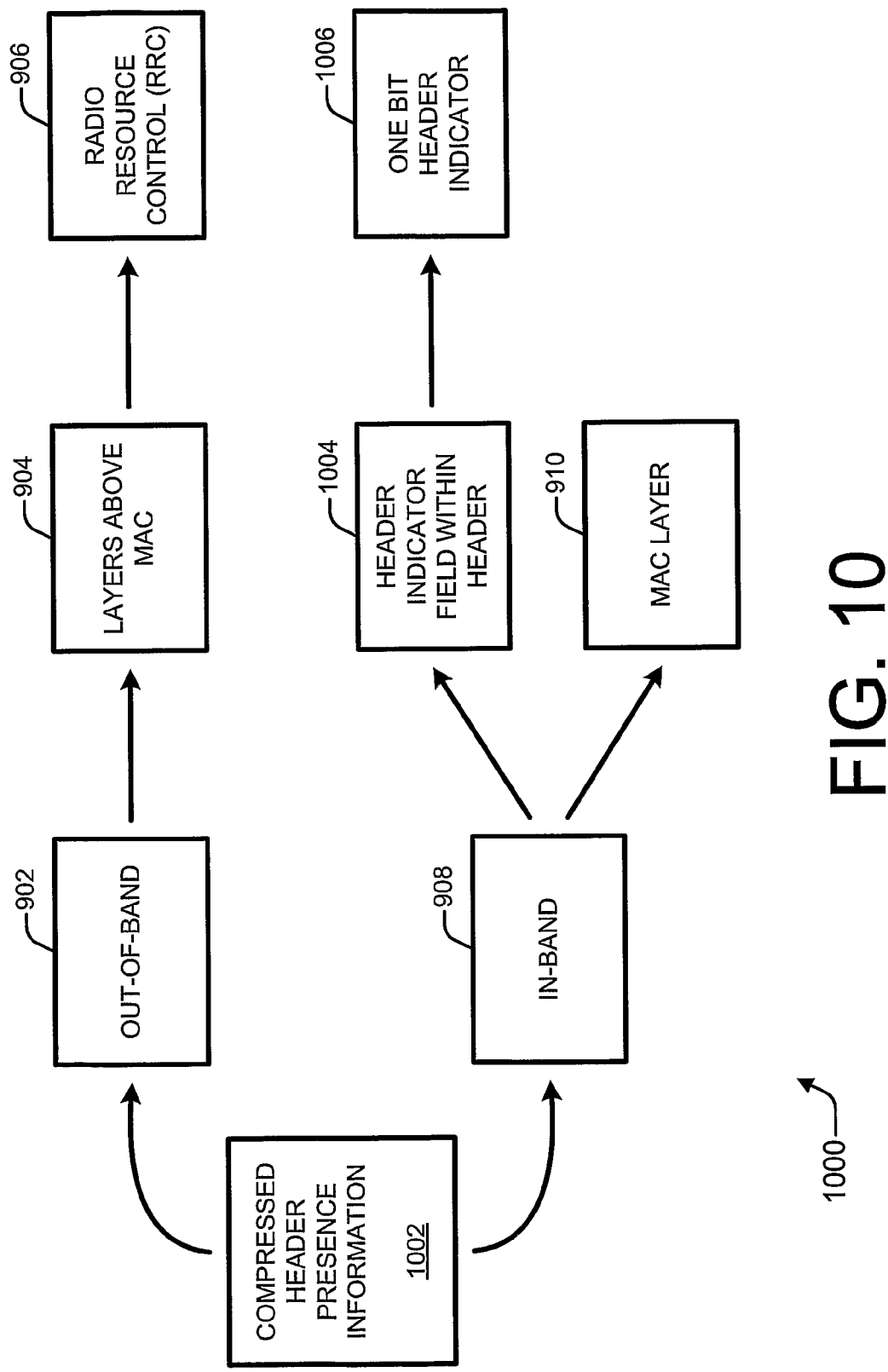
FIG. 10 illustrates example communication mechanisms for communicating compressed header presence information.

FIG. 10 illustrates example communication mechanisms 1000 for communicating compressed header presence information 1002. Compressed header presence information 1002 indicates the presence (or absence) of one or more compressed headers. Generally, compressed header presence information 1002 may indicate whether at least one header is a compressed header. Compressed header presence information 1002 may comprise, for example, one or more bits of an HI field (as shown in FIGS. 3-5). In such embodiments, the presence of a compressed header is indicated by a predetermined value in the HI field. In this manner, the presence of a compressed header is indicated on a header-by-header basis.

Alternatively, the presence of a compressed header may be indicated on a group basis by compressed header presence information 1002. A transmitting device may indicate to a receiving device that, for example, subsequent headers will be compressed headers. The compressed header presence information may indicate a predetermined number of consecutive compressed headers, may imply that each subsequent header will be compressed until further notice, and so forth. In such embodiments, compressed header presence information 1002 may be provided to a receiving device using other communication mechanisms besides an HI field in the header itself.

Thus, communication mechanisms 1000 for providing compressed header presence information 1002 when an HI field is not involved include out-of-band mechanisms 902. Out-of-band mechanisms 902 include signaling over layers 904 that reside above the MAC layer, such as the RRC layer 906. They also include in-band mechanisms 908, such as signaling over the MAC layer 910. As described above, communication mechanisms 1000 for providing compressed header presence information 1002 may also involve the inclusion of an HI field within the header 1004. In an example implementation, the HI field communication mechanism 1004 may comprise a one-bit header indicator mechanism 1006.

Figure 11:
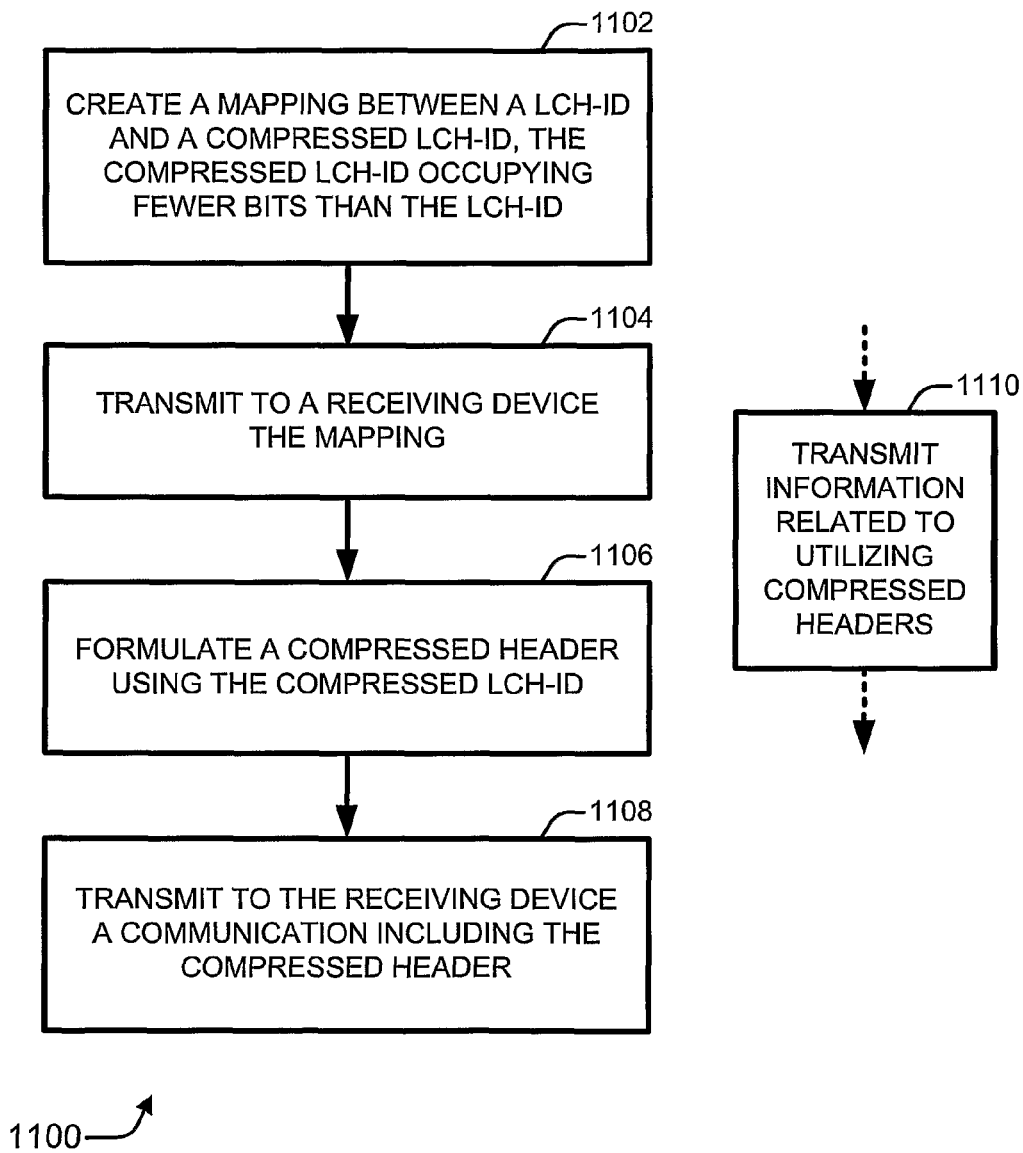
FIG. 11 is a flow diagram of an example method for communicating with compressed headers from the perspective of a transmitting device.
Figure 12:
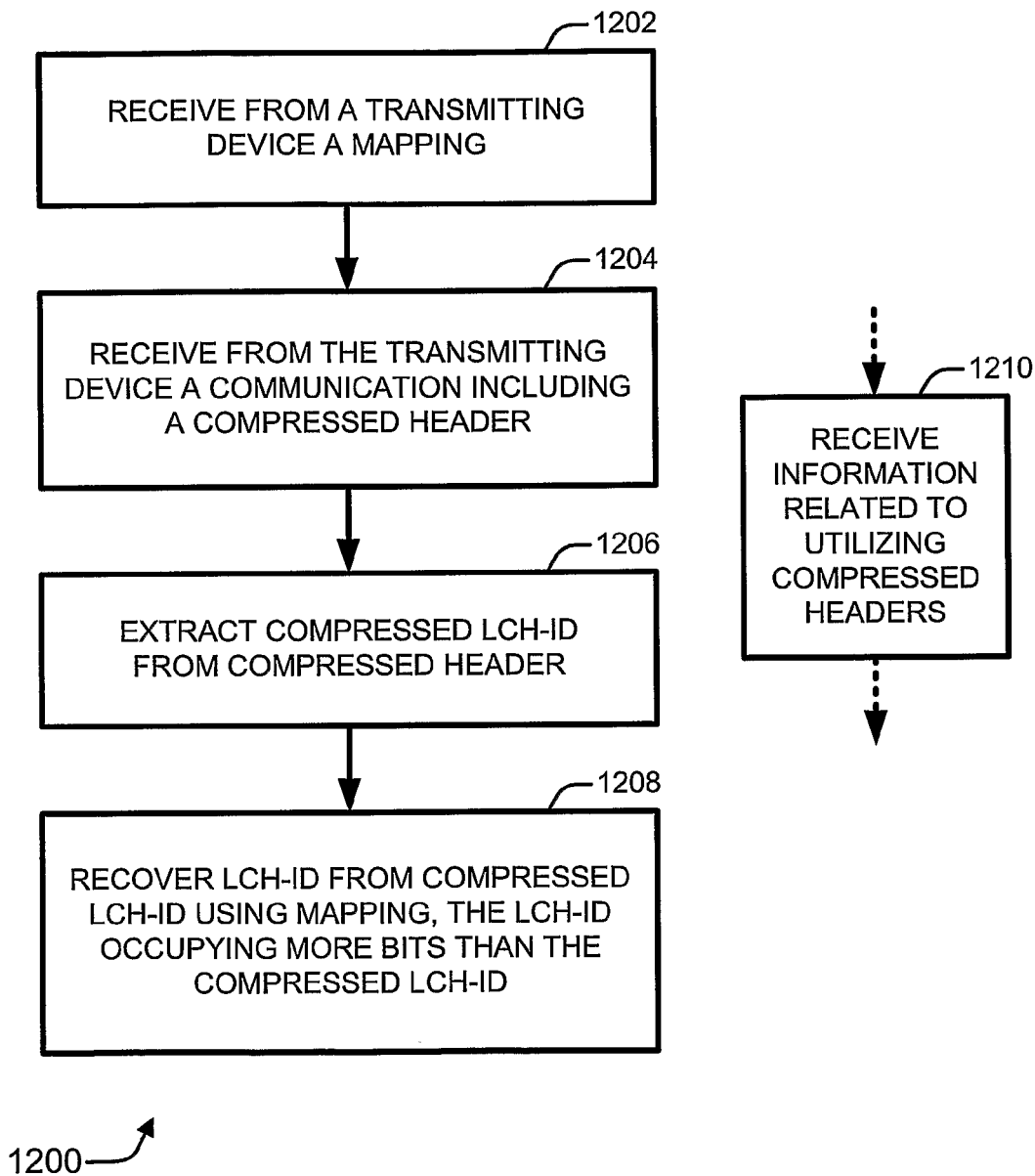
FIG. 12 is a flow diagram of an example method for communicating with compressed headers from the perspective of a receiving device.

FIGS. 11 and 12 are flow diagrams that illustrate different methods. The steps of these flow diagrams may be effectuated, for example, with processor-executable instructions. They may be performed in many different environments and with a variety of different apparatuses, arrangements, and systems, including but not limited to those illustrated in FIGS. 2-10. The order in which the methods are described is not intended to be construed as a limitation, and any number of the described blocks can be combined, augmented, rearranged, and/or omitted to implement a respective method, or an alternative method that is equivalent thereto.

FIG. 11 is a flow diagram 1100 of an example method for communicating with compressed headers from the perspective of a transmitting device. As illustrated, flow diagram 1100 includes five blocks 1102-1110. Flow diagram 1100 may be implemented by an apparatus, such as a transmitting device 202 (of FIG. 2). Example embodiments for the acts of flow diagram 1100 are described below with reference to other FIGS. (e.g., FIGS. 2, 8, and 9), but the acts may alternatively be performed by other elements.

At block 1102, a mapping is created between a LCH-ID and a compressed LCH-ID, with the compressed LCH-ID occupying fewer bits than the LCH-ID. For example, a mapping 806 may be created between a LCH-ID 802 and a compressed LCH-ID 804. The compressed LCH-ID, as represented by the C bits of the C Info field, occupies fewer bits than the LCH-ID.

At block 1104, the mapping is transmitted to a receiving device. For example, LCH mapping information 806 may be transmitted from transmitting device 202 to a receiving device 204 using a communication mechanism 900. The mapping is usable by the transmitting device to encode a LCH-ID into a compressed LCH-ID.

At block 1106, a compressed header is formulated using the compressed LCH-ID. For example, a compressed header (e.g., that comports with a compressed header format 300, 400, 600, or 700) may be formulated using the compressed LCH-ID as the C bits of the C Info field.

At block 1108, a communication including the compressed header is transmitted to the receiving device. For example, transmitting device 202 may transmit to receiving device 204 a signal 206 having the compressed header as formulated to include the compressed LCH-ID for the C Info field.

At block 1110, information related to utilizing compressed headers is transmitted to the receiving device. For example, compressed header presence information 1002 may be transmitted to receiving device 204 to indicate that at least one header is a compressed header. Generally, the contents, nature, and timing of the information relating to compressed headers may depend on the embodiment that is being implemented. For instance, the information related to utilizing compressed headers may be at least one bit for an HI field that is contained within a compressed header itself. Alternatively, the information related to utilizing compressed headers may be an indication that certain data transmissions include a compressed header. Such an indication may be transmitted separately from the compressed headers (and before, during, or after the header transmission).

FIG. 12 is a flow diagram 1200 of an example method for communicating with compressed headers from the perspective of a receiving device. As illustrated, flow diagram 1200 includes five blocks 1202-1210. Flow diagram 1200 may be implemented by an apparatus, such as a receiving device 204 (of FIG. 2). Example embodiments for the acts of flow diagram 1200 are described below with reference to other FIGS. (e.g., FIGS. 2, 8, and 9), but the acts may alternatively be performed by other elements.

At block 1202, a mapping is received from a transmitting device. For example, a mapping 806 may be received from a transmitting device 202 at receiving device 204. At block 1204, a communication including a compressed header is received from the transmitting device. For example, receiving device 204 may receive from transmitting device 202 a signal 206 that includes a compressed header (e.g., that comports with a compressed header format 300, 400, 600, or 700) having a C Info field.

At block 1206, a compressed LCH-ID is extracted from the compressed header. For example, C bits, which form the compressed LCH-ID, of a C Info field may be extracted from the compressed header. At block 1208, a LCH-ID is recovered from the compressed LCH-ID using the received mapping, with the LCH-ID occupying more bits than the compressed LCH-ID. For example, receiving device 204 may utilize the received LCH mapping information 806 to decode the compressed LCH-ID and recover the full LCH-ID.

At block 1210, information related to utilizing compressed headers is received. For example, compressed header presence information 1002 may be received from transmitting device 202 to indicate that at least one header is a compressed header. Generally, the contents, nature, and timing of the information related to compressed headers may depend on the embodiment that is being implemented. For instance, the information related to utilizing compressed headers may be at least one bit from an HI field contained within a compressed header itself. Alternatively, the information related to utilizing compressed headers may be an indication that certain data receptions include a compressed header. The indication may be received separately from the compressed headers (and before, during, or after reception of the header).

FIGS. 3, 4, 6, and 7 illustrate example compressed header formats. FIG. 5 illustrates example uncompressed header formats. FIG. 8 illustrates an example mapping scheme between a LCH-ID and a compressed LCH-ID. FIG. 9 illustrates example communication mechanisms for communicating LCH mapping information, and FIG. 10 illustrates example communication mechanisms for communicating compressed header presence information. These formats, mapping schemes, and communication mechanisms are presented by way of example, for they may be altered, reduced, and/or augmented in many manners.

Moreover, other aspects of communicating with compressed headers may be fixed, selectable, and/or configurable. As a first example, the length (e.g., 8 or 16 bits) of the compressed header may be fixed by a communication standard or may be adjustable during operation. When the compressed header length is operatively adjustable, a current length may be communicated from a transmitting device to one or more receiving devices via any of the communication mechanisms 900 (of FIG. 9). Alternatively, the receiving device may determine what the header length is by attempting each possible option in a blind detection process.

Secondly, the selected format (e.g., the field assignments of the 8 or 16 bits) of the compressed header may be fixed by a communication standard or definable during operation. When the selected format is operatively definable, a currently-selected format may be communicated from a transmitting device to one or more receiving devices via any of the communication mechanisms 900 (of FIG. 9).

Thirdly, the availability of a compressed header mode may be selectively activated. In other words, in one embodiment, compressed headers may be constantly available for use. In another embodiment, compressed headers may be available only when a compressed header mode is activated. In this latter embodiment, a transmitting device and/or a receiving device activates a compressed header mode to thereby make compressed headers available. This enables compressed headers to be turned on or off. The activation and/or deactivation of the compressed header mode may be effectuated via any of the communication mechanisms 900 (of FIG. 9). Also, a bit indicator for whether or not the compressed header mode is activated may be included in a system information block.

The compressed header mode may be active when a certain percentage of users are low data rate users, for example. More specifically, a system may employ full-length headers while it is primarily serving high data rate users, but it may then also employ compressed headers when the percentage of low data rate users so warrants. The activation of the compressed header mode may also be made on a per-call basis during call set-up in dependence on the type of services used.

Information related to the above-described three aspects may be transmitted at block 1110 (of FIG. 11) and/or received at block 1210 (of FIG. 12). It should be noted that communication with compressed headers has been described herein primarily in the context of DL traffic. However, compressed headers may also be implemented with UL traffic. For example, they may be employed in conjunction with MAC-i/is for the UL and with MAC-ehs for the DL.

Different embodiment(s) of the invention can offer one or more advantages. Generally, multiple described embodiments involve enabling a header of a smaller size to be used, especially with relatively lower rate data services. An advantage of certain embodiment(s) of the present invention is that the bandwidth overhead for low data rate services may be decreased. Another advantage of certain embodiment(s) of the present invention is that the overhead for low data rate services may be decreased to thereby use spectrum more efficiently without imposing a significant detrimental impact on other services. Yet another advantage of certain embodiment(s) of the present invention is that the overhead for low data rate services may be decreased to thereby improve coverage without creating a significant detrimental impact on other services.

The systems, acts, features, functions, methods, schemes, apparatuses, operations, components, arrangements, etc. of FIGS. 2-12 are illustrated in diagrams that are divided into multiple blocks and other elements. However, the order, interconnections, interrelationships, layout, etc. in which FIGS. 2-12 are described and/or shown are not intended to be construed as a limitation, and any number of the blocks and/or other elements may be modified, combined, rearranged, augmented, omitted, etc. in many manners to implement one or more systems, methods, devices, media, apparatuses, arrangements, etc. for communicating with compressed headers.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

The invention claimed is:

1. A method that is performed by a transmitting device to reduce header size, the method comprising the steps of:
    reducing, by the transmitting device, a number of available medium access control MAC services in comparison to a number of all available medium access control MAC services according to a number of bits available for coding of a compressed logical cell identifier field, the number of bits available for coding of the compressed logical cell identifier field being lower than the number of bits used for coding logical channel identifiers for all available MAC services;
    creating, by the transmitting device, a mapping between a subset of logical channel identifiers used for all available medium access control MAC services and compressed logical channel identifiers;
    transmitting, by the transmitting device, the mapping to a receiving device;
    formulating, by the transmitting device, a compressed header that includes the compressed logical channel identifier field; and transmitting, by the transmitting device, to the receiving device a communication that includes the compressed header.

2. The method as recited in claim 1, further comprising the step of transmitting, by the transmitting device, to the receiving device compressed header presence information indicating that at least one header is a compressed header.

3. The method as recited in claim 2, wherein the step of transmitting to the receiving device compressed header presence information comprises using a header indicator field in the compressed header.

4. The method as recited in claim 1, wherein the step of transmitting the mapping comprises the step of transmitting the mapping via an in-band mechanism or via an out-of-band mechanism.

5. The method as recited in claim 1, wherein the compressed header is one of:
  a compressed header that has a length of eight bits and comprises a header indicator field, a compressed channel information field, a transmission sequence number field, and a segmentation indicator field; and wherein the fields respectively occupy 1/1/4/2, 1/2/3/2, or 1/3/2/2 bits;
  a compressed header that has a length of 16 bits and comprises a header indicator field, a compressed channel information field, a transmission sequence number field, a segmentation indicator field, a length indicator field, and a flag field; and wherein the fields respectively occupy 1/1/4/2/7/1, 1/2/3/2/7/1, 1/3/2/2/7/1 bits;
  a compressed header that has a length of eight bits and comprises a compressed channel information field, a transmission sequence number field, and a segmentation indicator field; and wherein the fields respectively occupy 2/4/2, 1/5/2, or 3/3/2 bits; and
  a compressed header that has a length of 16 bits and comprises a compressed channel information field, a transmission sequence number field, a segmentation indicator field, a length indicator field, and a flag field; and wherein the fields respectively occupy 2/4/2/7/1, 1/5/2/7/1, 1/4/2/8/1, 3/3/2/7/1, or 2/3/2/8/1 bits.

6. The method as recited in claim 1, further comprising the step of transmitting, by the transmitting device, a header having an ordinary length that includes a header indicator field that indicates that the header comprises an uncompressed header.

7. The method as recited in claim 1, further comprising the step of communicating, by the transmitting device, an indication that a compressed header mode is being activated such that compressed headers become available.

8. A method that is performed by a receiving device to decode a header having a reduced size, the method comprising the steps of:
  receiving, by the receiving node, a mapping generated by reducing a number of available medium access control MAC services in comparison to a number of all available medium access control MAC services according to a number of bits available for coding of a compressed logical cell identifier field, the number of bits available for coding of the compressed logical cell identifier field being lower than the number of bits used for coding logical channel identifiers for all available MAC services; and by creating a mapping between a subset of logical channel identifiers used for all available medium access control MAC services and compressed logical channel identifiers;
  receiving, by the receiving node, from a transmitting device a communication including a compressed header;
  extracting, by the receiving node, from the compressed header a compressed logical channel identifier; and
  recovering, by the receiving node, a logical channel identifier from the compressed logical channel identifier by using the received mapping.

9. The method as recited in claim 8, further comprising the steps of:
  receiving, by the receiving node, at least one indication that an 8-bit or a 16-bit compressed header mode is being activated; and
  based on the at least one indication, interpreting, by the receiving node, subsequent headers as being 8-bit or 16-bit compressed headers.

10. The method as recited in claim 8, wherein the communication corresponds to a low data rate service, and the logical channel identifier corresponds to a medium access control, MAC, flow.

11. The method as recited in claim 8, further comprising the step of receiving, by the receiving node, compressed header presence information indicating that at least one header is a compressed header.

12. The method as recited in claim 11, wherein the step of receiving compressed header presence information comprises receiving one of:
  a header indicator field in the compressed header;
  information using an out-of-band mechanism that is separate from the compressed header; and
  information using an in-band mechanism that is separate from the compressed header.

13. A transmitting device that is adapted to reduce header size, the transmitting device comprising:
  at least one processor; and
  one or more memories that store processor-executable instructions where the processor interfaces with the one or more memories and executes the processor-executable instructions to effectuate performance of following acts:
  reducing a number of available medium access control MAC services in comparison to a number of all available medium access control MAC services according to a number of bits available for coding of a compressed logical cell identifier field, the number of bits available for coding of the compressed logical cell identifier field being lower than the number of bits used for coding logical channel identifiers for all available MAC services;
  creating a mapping between a subset of logical channel identifiers used for all available medium access control MAC services and compressed logical channel identifiers;
  transmitting the mapping to a receiving device;
  formulating a compressed header that includes the compressed logical channel identifier field; and
  transmitting to the receiving device a communication that includes the compressed header.

14. The transmitting device as recited in claim 13, wherein the processor interfaces with the one or more memories and executes the processor-executable instructions to effectuate performance of following act: transmitting to the receiving device compressed header presence information indicating that at least one header is a compressed header.

15. The transmitting device as recited in claim 13, wherein the compressed header is one of:

a compressed header that has a length of eight bits and comprises a header indicator field, a compressed channel information field, a transmission sequence number field, and a segmentation indicator field; and wherein the fields respectively occupy 1/1/4/2, 1/2/3/2, or 1/3/2/2 bits;

a compressed header that has a length of 16 bits and comprises a header indicator field, a compressed channel information field, a transmission sequence number field, a segmentation indicator field, a length indicator field, and a flag field; and wherein the fields respectively occupy 1/1/4/2/7/1, 1/2/3/2/7/1, 1/3/2/2/7/1 bits;

a compressed header that has a length of eight bits and comprises a compressed channel information field, a transmission sequence number field, and a segmentation indicator field; and wherein the fields respectively occupy 2/4/2, 1/5/2, or 3/3/2 bits; and a compressed header that has a length of 16 bits and comprises a compressed channel information field, a transmission sequence number field, a segmentation indicator field, a length indicator field, and a flag field; and wherein the fields respectively occupy 2/4/2/7/1, 1/5/2/7/1, 1/4/2/8/1, 3/3/2/7/1, or 2/3/2/8/1 bits.

16. The transmitting device as recited in claim 13, wherein the processor interfaces with the one or more memories and executes the processor-executable instructions to effectuate performance of following act: transmitting a header having an ordinary length that includes a header indicator field that indicates that the header comprises an uncompressed header.

17. The transmitting device as recited in claim 13, wherein the processor interfaces with the one or more memories and executes the processor-executable instructions to effectuate performance of following act: communicating an indication that a compressed header mode is being activated such that compressed headers become available.

18. A receiving device that is adapted to decode a header having a reduced size, the receiving device comprising:
at least one processor; and
one or more memories that store processor-executable instructions where the processor interfaces with the one or more memories and executes the processor-executable instructions to effectuate performance of following acts:
receiving a mapping generated by reducing a number of available medium access control MAC services in comparison to a number of all available medium access control MAC services according to a number of bits available for coding of a compressed logical cell identifier field, the number of bits available for coding of the compressed logical cell identifier field being lower than the number of bits used for coding logical channel identifiers for all available MAC services; and by creating a mapping between a subset of logical channel identifiers used for all available medium access control MAC services and compressed logical channel identifiers;
receiving from a transmitting device a communication including a compressed header;
extracting from the compressed header a compressed logical channel identifier; and
recovering a logical channel identifier from the compressed logical channel identifier using the mapping.

19. The receiving device as recited in claim 18, wherein a medium access control, MAC, entity of the receiving device does not expect to receive a length indicator or a flag bit if a segmentation indicator indicates that a current packet data unit, PDU, contains a complete service data unit, SDU.

20. The receiving device as recited in claim 18, wherein the processor interfaces with the one or more memories and executes the processor-executable instructions to effectuate performance of following acts:
receiving at least one indication that an 8-bit or a 16-bit compressed header mode is being activated; and
based on the at least one indication, interpreting subsequent headers as being 8-bit or 16-bit compressed headers.

* * * * *